United States Patent [19]

Iwata

[11] 4,107,704
[45] Aug. 15, 1978

[54] CIRCUIT FOR DIGITALLY COMPUTING EXPOSURE CONTROL INFORMATION

[75] Inventor: Shigehisa Iwata, Tokyo, Japan

[73] Assignee: Nippon Electric Co., Ltd., Tokyo, Japan

[21] Appl. No.: 709,746

[22] Filed: Jul. 29, 1976

[30] Foreign Application Priority Data

Jul. 29, 1975 [JP] Japan .................................. 50-92786

[51] Int. Cl.² ............................................... G03B 7/08
[52] U.S. Cl. .................... 354/23 D; 354/50; 354/60 A
[58] Field of Search ............... 354/23 D, 50, 51, 60 A

[56] References Cited

FOREIGN PATENT DOCUMENTS 2,538,144  3/1976  Fed. Rep. of Germany ........ 354/23 D
2,434,152  2/1975  Fed. Rep. of Germany ........ 354/23 D Primary Examiner—Russell E. Adams
Attorney, Agent, or Firm—Sughrue, Rothwell, Mion, Zinn and Macpeak

[57] ABSTRACT

A circuit for digitally computing the information necessary for controlling the shutter speed or aperture in an automatically exposure-controlled camera is based on a unique algorithm. Based on this algorithm, the shutter speed, for example, can be computed by first generating a number of pulses corresponding to the preset aperture and film speed and deciding to which of three predetermined values this number corresponds. Then the brightness value, which has been separately measured, is repeatedly doubled according to the decision made with respect to the number of pulses generated. The resulting value is exponentially compensated as required to obtain the shutter speed.

9 Claims, 14 Drawing Figures

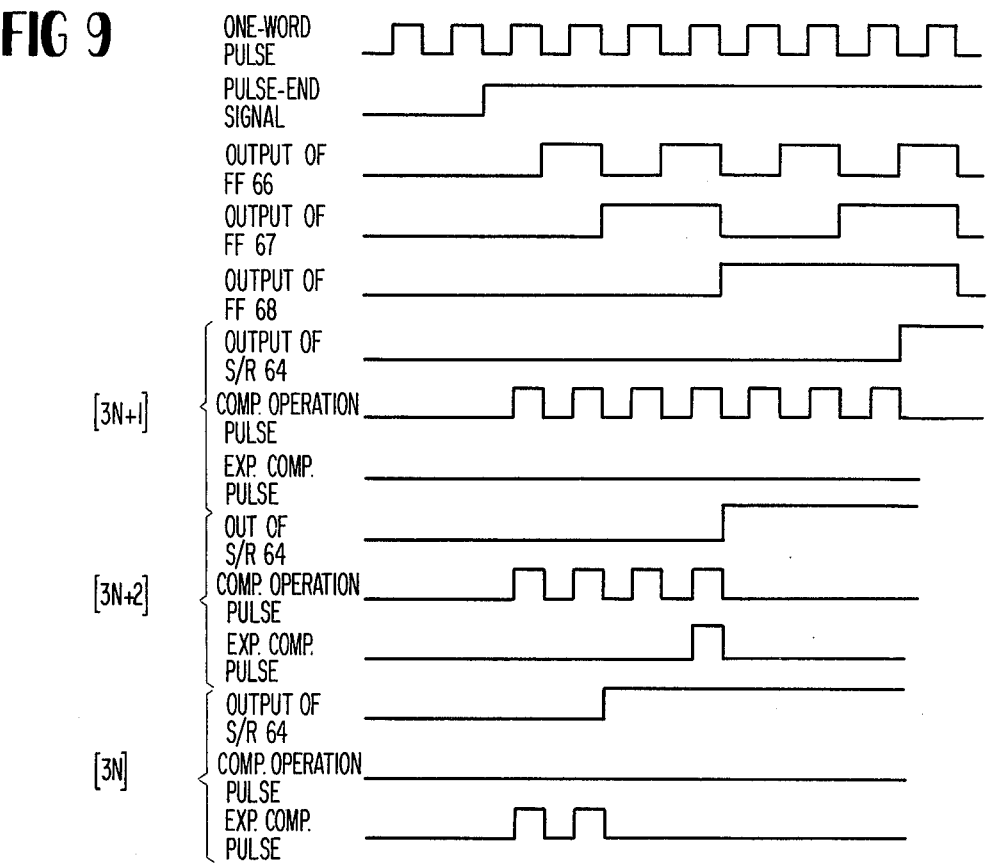
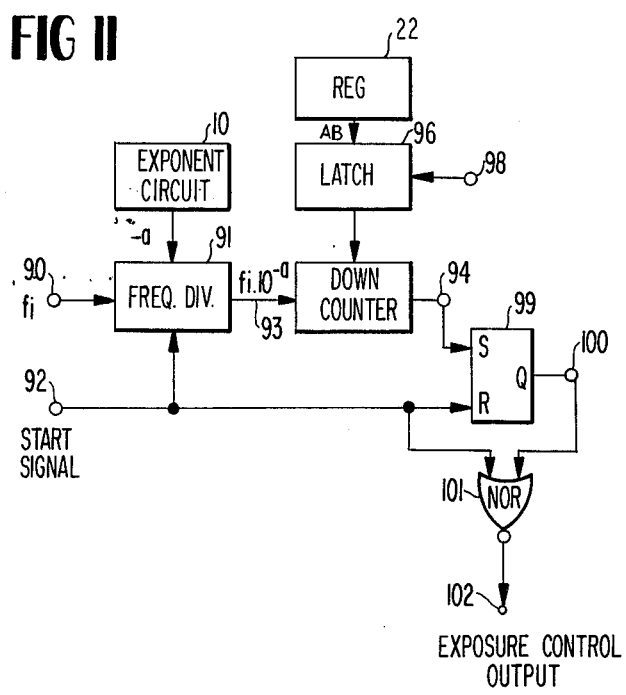
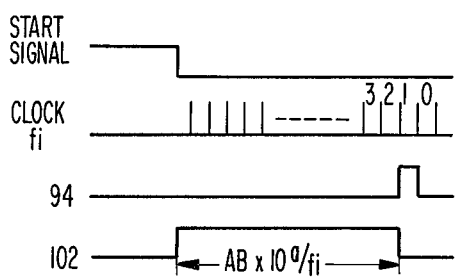

CIRCUIT FOR DIGITALLY COMPUTING EXPOSURE CONTROL INFORMATION

BACKGROUND OF THE INVENTION

The present invention relates to a circuit for digitally computing exposure control information for use in a camera that control exposure automatically, and more particularly to a circuit for digitally computing the information necessary for controlling the shutter speed or aperture in an automatically exposure-controlled camera.

The shutter speed T of a camera, that is, the time during which the shutter is opened, is given as:

$$T = K(1/L)(1/ASA)F \qquad (1)$$

where,
L: scene brightness
ASA: film sensitivity
F: aperture
K: constant of proportionality In a camera, in other words, the proper shutter speed can be derived from the product of the reciprocal of the scene brightness value (1/L), the reciprocal of the film sensitivity value (1/ASA), and the aperture value F.

The conventional automatically exposure controlled camera has employed an analog circuit for computing the shutter speed. In such a circuit, the shutter speed has had to be computed through the steps of logarithmically compressing values of the respective information, calculating the sum of the compressed values in place of the product of the original values, and logarithmically expanding the result of the calculation, because the ratio of a maximum value to the minimum value for the brightness information exceeds $10^6$. Such an analog circuit, however, requires intricate adjustment and uses circuit elements with characteristics of high accuracy and precision, in order to maintain substantial operating stability against voltage and temperature variations. One prior art approach to solve this problem has been to use a digital circuit using semiconductor circuit elements. This circuit may be advantageous in that it can be operated with high accuracy without intricate adjustment and that a shutter speed can be readily displayed. On the other hand, however, the prior art digital circuit has taken an unpractically long time for photometering and computing. The approach to reduce the photometering or computing time by reducing the number of significant figures of the values of the respective information to be computed has led to low accuracy in computation.

SUMMARY OF THE INVENTION

It is therefore an object of the present invention to provide a circuit for digitally computing exposure control data, which can be operated at high speed and with high accuracy.

It is another object of the invention to provide a circuit for digitally computing exposure control data, which comprises a simplified computing circuit.

The circuit of the invention is based on the following principles. The selectable aperture numbers on a dial scale provided in a camera are generally in a sequence of definite numbers having a predetermined relationship to each other from a minimum aperture number F(0) to a maximum one, and the $n_1$-th aperture number $F(n_1)$ from the minimum number F(0) is given by $$F(n_1) = F(0) \cdot (2^{1/3})^{n_1}.$$

Similarly, the film sensitivities ASA capable to be set in a camera are in a predetermined sequence from a maximum sensitivity ASA(0) to a minimum one, and the $n_2$-th film sensitivity $ASA(n_2)$ from the maximum sensitivity ASA(0) is given by $$ASA(n_2) = ASA(0) \cdot (2^{1/3})^{-n_2}.$$

Therefore, the shutter speed T in Eq. (1) can be represented by $$T = K'(1/L)(2^{1/3})^{(n_1 + n_2)} \qquad (2)$$

where K' is a constant being $K \cdot F(0) \cdot ASA^{-1}(0)$. The numerals $n_1$ and $n_2$ of course represent zero or positive integers, respectively. As indicated by Eq. (2), the shutter speed T is a function of the brightness value (1/L) and 0 or positive integers $n_1$ and $n_2$.

According to the invention, the aperture number $F(n_1)$ selected and the film sensitivity $ASA(n_2)$ set by the operator of the camera are not introduced, by themselves, into the shutter speed computing circuit, but the numbers $n_1$ and $n_2$ are detected and introduced into the circuit. Specifically, the number $n_1$ corresponding to the selected aperture $F(n_1)$ position and the number $n_2$ corresponding to the set film sensitivity $ASA(n_2)$ are detected. In the invention, a pulse train representing the sum of these numbers $(n_1 + n_2)$ is generated at a cycle of one word time for use as the input to the shutter speed computing circuit.

Here, the sum $(n_1 + n_2)$ is represented as n, that is, $n = n_1 + n_2$. The sum n can be expressed by any one of $3N+1$, $3N+2$, and $3N$, where N stands for 0 or a positive integer. Then, Eq. (2) can be expressed for these three n's as follows:

$$n = 3N+1: T = K' \cdot 1/L \cdot (2^{1/3} \cdot 2^N) \qquad (3)$$

$$n = 3N+2: T = K' \cdot 1/L \cdot (2^{2/3} \cdot 2^N) \qquad (4)$$

$$n = 3N: T = K' \cdot 1/L \cdot (2^N) \qquad (5)$$

As $2^{1/3} = 1.26$ and $2^{2/3} = 1.60$, $2^{1/3}$ in Eq. (3) is approximated as $2^7 \times 10^{-2} = 1.28$ and $2^{2/3}$ in Eq. (4) as $2^4 \times 10^{-1} = 1.6$, according to this invention. Errors ascribed to this approximation are +1.6% and 0.8%, respectively, and are allowable for exposure control of a camera. Thus, Eqs. (3), (4) and (5) are represented by the invention as $$T = K' \cdot 1/L \cdot (2^{N+7} \cdot 10^{-2}) \qquad (3)'$$

$$T = K' \cdot 1/L \cdot (2^{N+4} \cdot 10^{-1}) \qquad (4)'$$

$$T = K' \cdot 1/L \cdot (2^N) \qquad (5)'$$

From Eqs. (3)', (4)' and (5)' the shutter speed T can be computed in the following manner. The number of input information pulses n corresponding to the preset aperture F and film sensitivity ASA is counted, and a decision is made as to which of $3N+1$, $3N+2$ and $3N$ the counted number of pulses corresponds. Then a doubling operation is performed repeatedly on the brightness value 1/L which is separately measured and given in digital form, $N+7$, $N+4$ and $N$ numbers of times, respectively, according to the decision based on the counting operation, and the computed value is exponentially compensated for when the number of input pulses counted is $3N+1$ or $3N+2$. The shutter speed thus obtained is a practical value because, as described, operation errors should be +1.6%, +0.8% and ±0% respectively for $3N+1$, $3N+2$ and $3N$.

Therefore, a circuit arrangement for digitally computing an exposure control information of the invention comprises: pulse generating means for converting preset exposure information such as aperture and film sensitivity into a number of input pulses corresponding to the quality of preset values; means for counting the number of the input pulses and generating an operation pulse for each count of three pulses; means for deciding to which of $3N+1$, $3N+2$ and $3N$ (where N is 0 or a positive integer) the counted number of the input pulses corresponds and means responsive to the decision means for generating, at the end of the input pulses, seven or four additional operation pulses according to the output of the decision means when the number of the input pulses is $3N+1$ or $3N+2$, respectively, and means for generating an exponential compensating signal according to the number of the input pulses. Moreover, the circuit of the invention comprises register means for digitally storing an exposure value such as the subject brightness and means for doubling the value of the contents stored in the register repeatedly according to the sum of the numbers of the operation pulses and the additional operation pulses. A shutter drive signal for determining the shutter speed is derived from the output of the double operating means and the output of the compensating signal generating means.

According to the invention, the shutter speed can be computed virtually by repetition of the doubling operation, with the result that the circuit construction is simplified and the operation speed is increased with the improved operation accuracy.

BRIEF DESCRIPTION OF THE DRAWINGS

Further objects, features and advantages of the invention will become more apparent from the following description taken in conjunction with the accompanying drawings, wherein:

FIG. 9 is a waveform diagram for illustrating the operation of the circuit shown in FIG. 8, FIG. 11 is a block diagram showing an example of an exposure control circuit, FIG. 12 is a waveform diagram for illustrating the operation of the circuit shown in FIG. 11.

DESCRIPTION OF THE PREFERRED EMBODIMENTS

Figure 1:
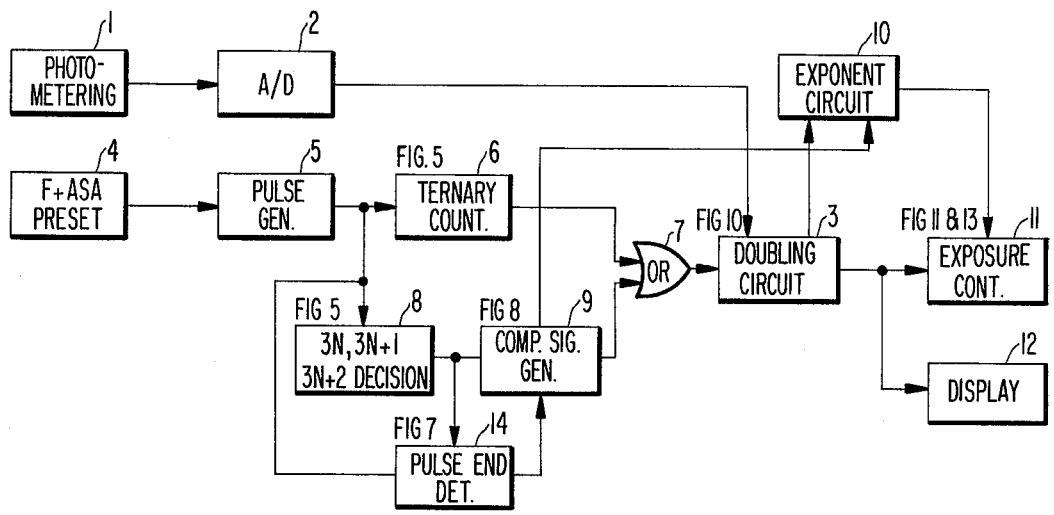
FIG. 1 is a block diagram for illustrating the principles of the present invention.

With reference to FIG. 1, an electrical signal corresponding to the brightness of a subject is generated by a photoelectric element, e.g., CdS cell or photocell, in a photometering circuit 1. This brightness information signal is converted into a digital signal by an analog-to-digital (A/D) converter 2 and then stored in a memory register in a doubling circuit 3. A train of pulses corresponding to the output of the aperture and film sensitivity setting circuit 4 is gating by a pulse generating circuit 5. A ternary counter 6 counts the number of the generated pulses and generates a double-operation pulse for each count of three pulses. The double-operation pulse goes to an input of OR gate 7. The pulse train from the pulse generating circuit 5 is also supplied to a decision circuit 8 capable of deciding to which of $3N+1$, $3N+2$ and $3N$ the number of the pulses generated from the pulse gating circuit 5 corresponds. The circuit 8 in turn generates output signals according to the number of the pulses $3N+1$, $3N+2$ or $3N$. Receiving this output, a compensating signal generating circuit 9 generates seven or four additional double-operation pulses in response to the number of the pulses $3N+1$ or $3N+2$. The compensating signal generating circuit 9 is activated by an output signal from a pulse end detecting circuit 14 capable of detecting the end of the pulse train gating by the pulse generating circuit 5. The circuit 9 thereby generates an auxiliary operation pulse at a time when a pulse train ends. This output pulse goes to the other input of the OR gate 7. Thus, through the OR gate 7, the doubling circuit 3 receives seven or four additional operation pulses subsequent to the doubling operation pulse generated each count of three pulses from the pulse gating circuit 5.

The compensating signal generating circuit 9 also generates exponential compensating signals, which are used to make equal all exponents of the results of the doubling operations for all the cases where the numbers of the input information pulses are $3N+1$, $3N+2$ and $3N$.

For this purpose, when the numbers of the input pulses are $3N+2$ and $3N$, one and two compensating pulses are respectively generated by the circuit 9. This signal is supplied to an exponential circuit 10. In the doubling circuit 3, double-operations are repeated on the brightness information stored in the register as often as the number of the doubling operation pulses (including the additional operation pulses). A carry signal resulting from the doubling operations, the exponential signal of the light information, and the output of the exponential compensating signal generating circuit 9 are supplied to the exponential circuit 10. An exposure control circuit 11 is operated by the output of the double-operation circuit 3 and the output of the exponential circuit 10, causing the exposure control circuit 11 to generate an exposure control output for a period corresponding to the given inputs. An exposure mechanism such as the shutter is driven by the exposure control output. The shutter speed obtained may be displayed digitally on the view-finder or like place by the output of the doubling circuit 3 through a display circuit 12.

Figure 2:
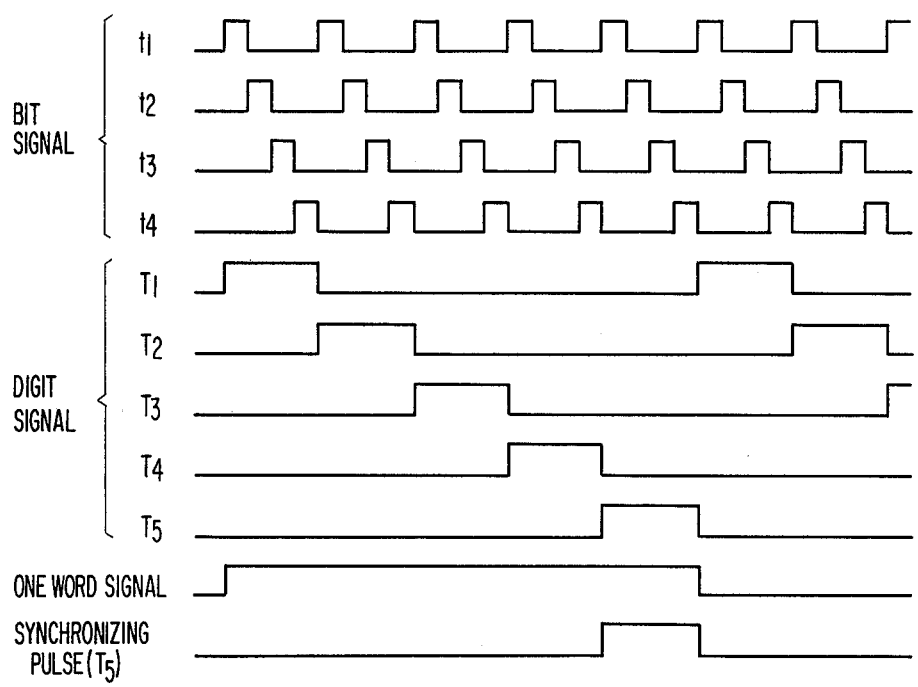
FIG. 2 is a diagram of basic timing waveforms used to describe the operation of the circuit of the invention.

Referring to FIG. 2, there are shown timing waveforms used for describing the operation of the circuit of the invention. An input brightness value in digital from, when stored in the register of the double operation circuit 3, is converted into a binary-coded decimal number (BCD) having 4-bits per one digit, allowing operations to be performed in the BCD mode. To this effect, 4-bit signals $t_1$ to $t_4$ are used in each of digit periods $T_1$ to $T_5$. For three significant digits, operations are performed during periods of four digits, and one remaining digit is used for control. Thus, one word period consists of 5 digits. An operation pulse is used for operations for a period of one word. A synchronizing pulse synchronous with the fifth digit signal $T_5$ is generated for purposes described later. Such timing pulses may be obtained by the use of a known pulse generating circuit.

Figure 3:
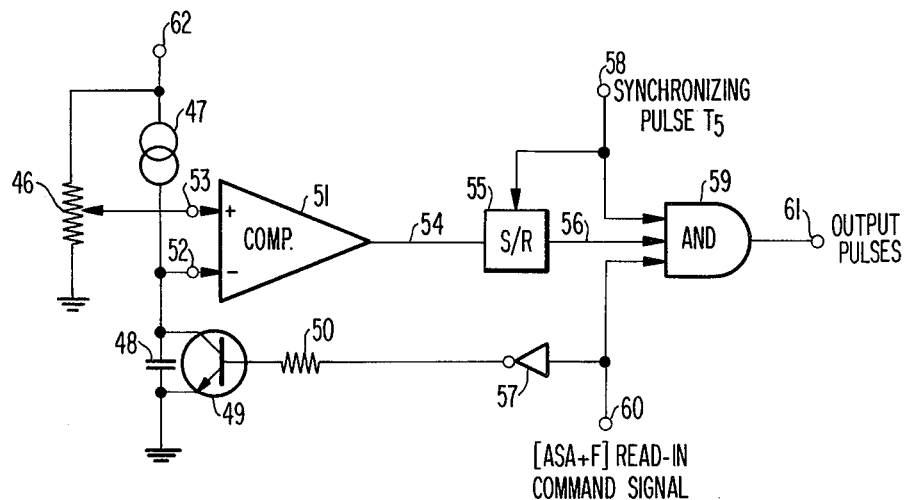
FIG. 3 is a circuit diagram showing one example of an aperture and film sensitivity setting circuit and a pulse gating circuit.

Referring to FIG. 3, an example of an aperture and film sensitivity setting circuit and pulse gating circuit corresponding to blocks 4 and 5 of FIG. 1 are shown in block form. Operations of the individual circuits shown in FIG. 3 will be described in reference to FIG. 4. The tap of a variable resistor 46 interlocks with an aperture and film sensitivity setting dial. The variable resistor 46 has one end connected to a power supply terminal 62, the other end grounded, and the top of variable resistor 46 is connected to an input terminal 53 of a comparator 51. A capacitor 48 is charged by a constant current source 47 which has one terminal connected to the power supply terminal 62. The junction between the capacitor 48 and the current source 47 is connected to the other input terminal 52 of the comparator 51. An output terminal 54 of the comparator 51 is connected to one input of a 3-input AND gate 59 through a shift register 55 which is controlled by the synchronizing pulse ($T_5$) shown in FIG. 2. The synchronizing pulse and an (ASA + F) read-in command signal are applied respectively to the other inputs of the AND gate 59. An (ASA + F) read-in command signal input terminal 60 is connected to the base of a switching transistor 49 through an inverter 57 and a resistor 50. The transistor 49 has its collector and emitter connected to both ends of the capacitor 48. The potential at the variable tap of the variable resistor 46 referenced to ground is determined by means of the aperture and film sensitivity setting dial of a camera. A voltage proportional to the number of dial steps of ASA and F is thus provided at one input terminal 53 of the comparator 51. A voltage waveform, or a sawtooth waveform, resulting from charging the capacitor 48 with a constant current through the constant current source 47, is provided at the inverting input terminal 52 of the comparator 51. The transistor 49 serves to discharge the capacitor 48.

Figure 4:
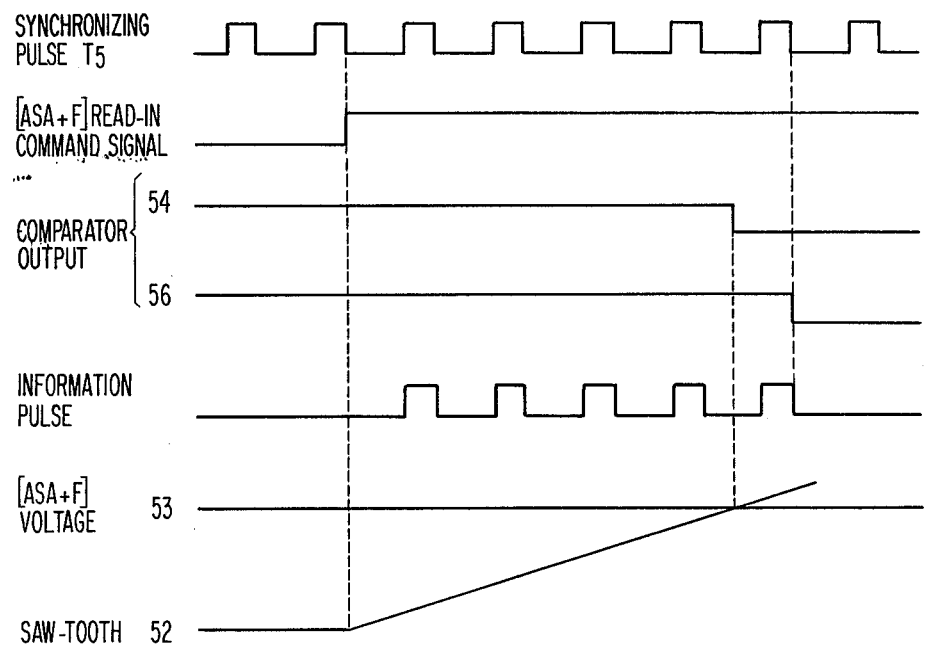
FIG. 4 is a waveform diagram for illustrating the operation of the circuit shown in FIG. 3.

The transistor 49 turns on while the (ASA + F) read-in command signal is at a low level, causing the input terminal 52 to be at approximately ground potential. The output terminal 54 of the comparator 51 is at a high level because a potential proportional to the step number of ASA + F is present at the other input terminal 53. Through the shift register 55, the comparator output synchronous with the synchronizing pulse $T_5$ is provided at an output terminal 56. A low level potential is maintained at an output terminal 61 of the AND gate 59, and no synchronizing pulse is present at this terminal. When the (ASA + F) read-in command signal rises to a high level as shown in FIG. 4, the AND gate 59 is enabled, causing synchronizing pulses $T_5$ to be present at the output terminal 61. Concurrently, a low level potential is provided at the output of the inverter 57, and the discharging transistor 49 turns off. At this moment, charging across the capacitor 48 by the constant current source 47 begins, and a sawtooth wave with a given slope with the time axis is provided at the terminal 52 of the comparator 51. With a lapse of time, the sawtooth wave coincides with the ASA + F step voltage at the input terminal 53 whereby the comparator output at the terminal 54 is inverted into a low level. This output is synchronized with the synchronizing pulse and shifted by the shift register 55 and then provided at one input of the AND gate 59. At this moment, the AND gate 59 is disabled, causing no pulse to be present at the output terminal 61. Therefore, at the output 61, a number of pulses proportional to the ASA + F step potential is obtained. The ASA + F voltage and the sawtooth voltage are so adjusted that the number of the output pulses corresponds to the sum of the step number $n_1$ of the F setting from the minimum F value and the step number $n_2$ of the ASA setting from the maximum ASA value.

Figure 5:
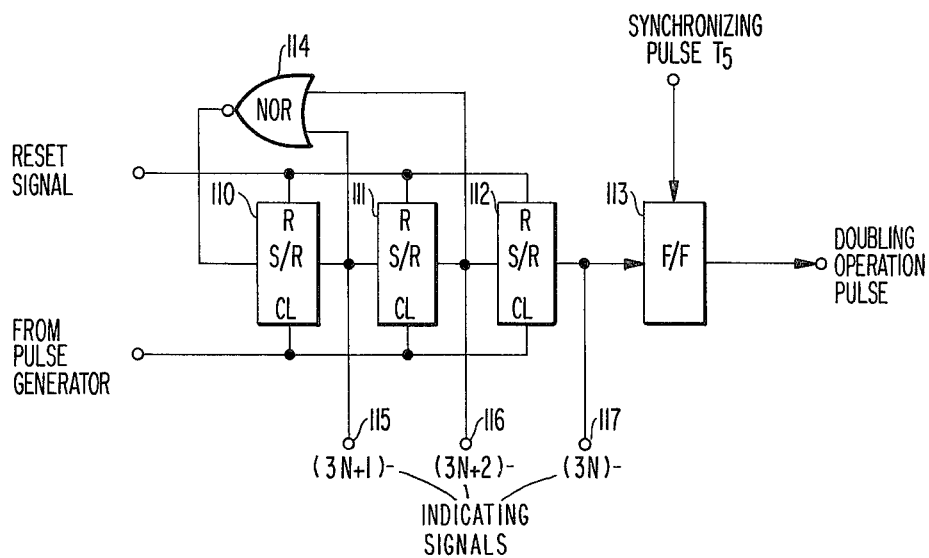
FIG. 5 is a circuit diagram showing one example of a ternary counter circuit and a decision circuit.
Figure 6:
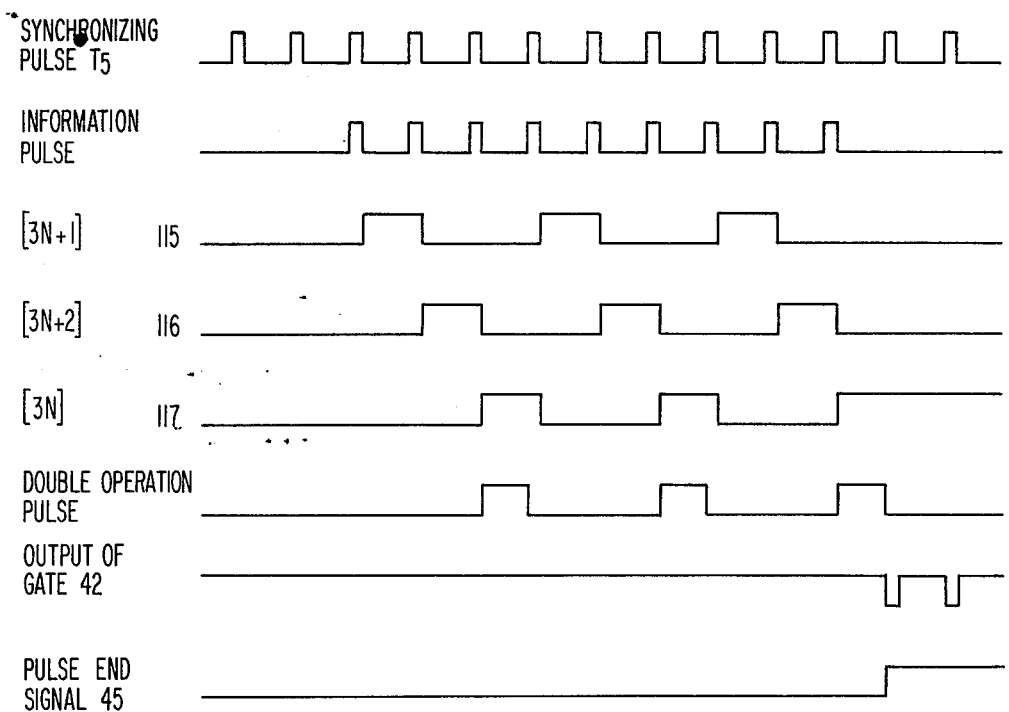
FIG. 6 is a waveform diagram for illustrating the operation of the circuit shown in FIG. 5.

Referring to FIG. 5, there is shown an example of the ternery counter and the decision circuit. FIG. 6 is a waveform diagram for illustrating the operation of the circuit shown in FIG. 5. Three shift registers 110, 111 and 112 are serially connected, having their clock input terminals CL supplied with input pulses from pulse generator 5. The information stored in the first shift register 110 is shifted to the next shift register 111, and thence to the shift register 112 at each arrival of an input pulse. The output of the shift register 112 is applied to a flip-flop 113, and the output of the flip-flop 113 is an operation pulse which goes to one input of the OR gate 7 (FIG. 1). The outputs of the shift registers 110 and 111 are applied to a 2-input NOR gate 114, and the resultant output is fed back to the input of the shift register 110.

In the initial state, the three shift registers are reset by a reset signal, and output terminals 115, 116 and 117 are at a low level, and the output of the NOR gate 114 is at a high level. Therefore, the input 115 of the first shift register 110 is at a high level. At each arrival of an input pulse, this high level signal is shifted in sequence, causing the outputs of shift registers 110 and 111 to again be at a low level. When these outputs are concurrently at a low level, the input 115 of the shift register 110 is again at a high level. This state is the same as the initial state, and one cycle of operation ends. At the output terminal 117, as shown in FIG. 6 one pulse is [3N] generated for every third input pulse [3N+] and [3N+2]. At terminals 115 and 116, pulses are generated respectively when the numbers of pulses generated from the pulse generating circuit 5 (FIG. 1) are 3N+1 and 3N+2. Thus, by the [3N+1]—, [3N+2]—, and [3N]— indicating signals at the terminals 115, 116 and 117, it is decided to which of 3N+1, 3N+2 and 3N the number of input pulses corresponds.

The flip-flop 113 is set by the pulse at the output terminal 117 and is reset by each synchronizing pulse $I_5$ synchronous with the input pulses whereby a necessary double-operation pulse is obtained at the flip-flop output. The synchronizing pulse which resets the flip-flop 113 is a signal synchronous with the fifth digit signal $T_5$ as shown in FIG. 2 and hence the operation pulse is shorter than a one-word pulse by the fifth digit period $T_5$. This period $T_5$ is used for controlling other circuits.

Figure 7:
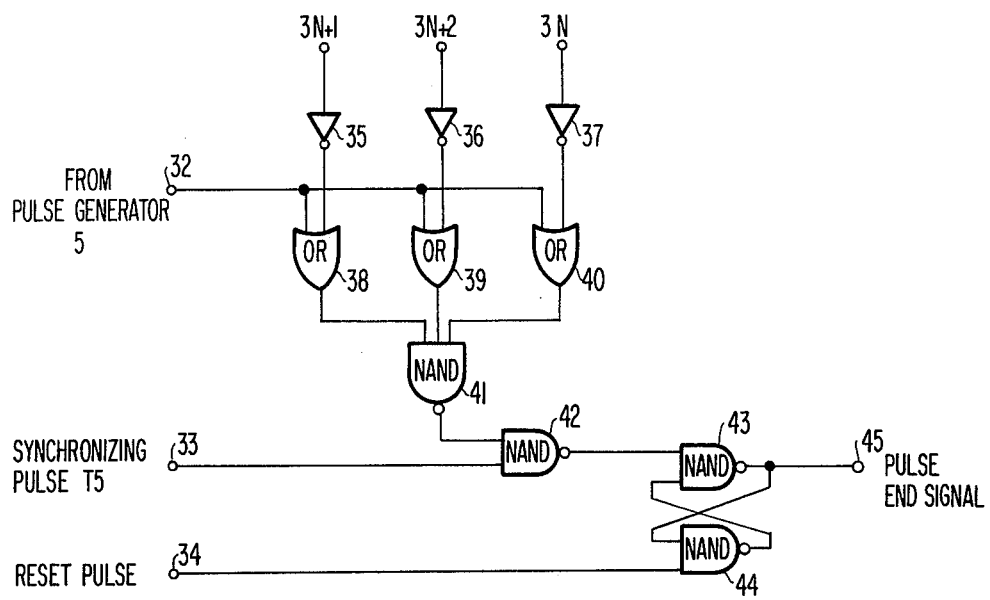
FIG. 7 is a diagram showing one example of a pulse end detecting circuit.

Referring to FIG. 7, there is shown an example of a circuit of a pulse end detecting circuit 14 (FIG. 1). The operation of this circuit is illustrated by the waveform diagrams in FIG. 6. Inverting circuits 35, 36 and 37 invert the output signals [3N+1], [3N+2] and [3N], respectively, of the decision circuit 8 (FIG. 6). The inverted signals go to inputs of 2-input OR gates 38, 39 and 40 respectively. An input pulse from pulse gating circuit 5 is supplied to a terminal 32 where the other input terminals of the OR gates 38, 39 and 40 are connected in common. The outputs of these OR gates is connected to a 3-input NAND gate 41. The decision circuit outputs [3N+1], [3N+2] and [3N] and 3N are at a low level because the ternary counter 6 remains reset until an input pulse comes in. As a result, all the inputs of the NAND gate 41 are at a high level. When input pulses comes in, the outputs of the inverters 35, 36 and 37 drop to a low level successively; however, the outputs of the gates 38, 39 and 40 remain at a high level as long as an input pulse is present. The output of the 3-input NAND gate 41 is connected to one input of a 2-input NAND gate 42. A synchronizing pulse $T_5$ is supplied to the other input 33 of the NAND gate 42. Therefore the two inputs of the 2-input NAND gate 42 cannot be concurrently at a high level before and while an input pulse comes in. In other words, the output of the gate 42 is at a high level. Cross-coupled 2-input NAND gates 43 and 44 constitute an $\overline{R}$-$\overline{S}$ flip-flop. An input terminal 34 is supplied with a reset pulse generated when power is on. In this state, the output 45 is at a low level. The output of the gate 42 turns to a low level at the time of a synchronizing pulse when an input pulse is terminated. At this moment, the output at the terminal 45 turns to a high level.

Figure 8:
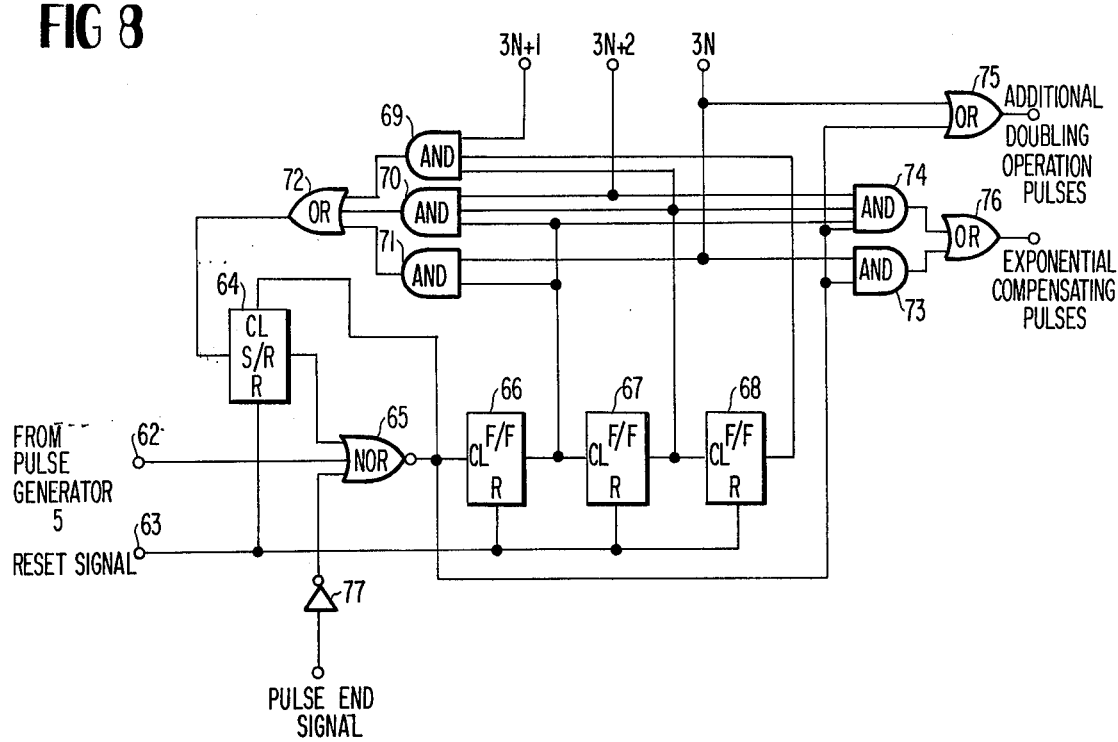
FIG. 8 is a circuit diagram showing an example of a compensating signal generating circuit.

Referring to FIG. 8, there is shown an example of a compensating signal generating circuit shown in block form in FIG. 1. FIG. 9 shows waveforms for illustrating the operation of the circuit shown in FIG. 9. Serial flip-flops 66, 67 and 68 constitute a binary counter. AND gates 69, 70 and 71 and an OR gate 72 constitute a circuit which detects the state of the binary counter. The output of the flip-flop 66 is connected to the AND gates 70 and 71, the output of the flip-flop 67 to the AND gates 69 and 70, and the output of the flip-flop 68 to the AND gate 69. The decision circuit outputs [3N+1], [3N+2] and [3N] are applied to other inputs of the AND gates 69, 70 and 71 respectively. The outputs of the AND gates 69, 70 and 71 are connected respectively to three inputs of a 3-input OR gate 72, and the output of the OR gate 72 is connected to a shift register 64. The output of the shift register 64 and the one-word signal (i.e., operation pulse) are supplied respectively to two inputs of a 3-input NOR gate 65. A pulse end signal, inverted by an inverting circuit 77, is supplied to the other input of the NOR gate 65. The shift register 64 is driven by the output of the NOR gate 65. This NOR gate output is counted by the binary counter. The output of the gate 65 is connected to an input of a two-input OR gate 75 for generating additional doubling operation pulses and also to inputs of AND gates 73 and 74 for generating an exponential compensating pulse. The decision circuit output [3N] is supplied to the other inputs of the gates 73 and 75, and the decision circuit output [3N+2] and outputs of the flip-flops 66 and 67 are supplied to the other inputs of the gate 74. The outputs of the gates 73 and 74 are connected to the inputs of a 2-input OR gate 76. The output of the gate 76 is an exponential compensating pulse.

In the initial state, the pulse end signal is at a low level and one input of the NOR gate 65 is at a high level due to the output of the inverter 77, and hence the NOR gate 65 is inhibited. When a pulse from pulse gating circuit 5 is terminated, the pulse end signal turns to a high level, causing the compensating signal generating circuit 9 to start generating the additional operation pulses and the exponential compensating signal concurrently when the counter starts counting the operation pulse. A reset signal is applied to the input terminal 63, thereby resetting the binary counter to an initial state. One of the decision circuit outputs [3N+1], [3N+2] and [3N] goes to a high level according to the number of information pulses is 3N+1, 3N+2 or 3N. When the input signal [3N+1] is at a high level, the output of the AND gate 69 is at a high level under the condition that the outputs of the flip-flops 67 and 68 are at a high level, i.e., the state of the counter is "6" in BCD. Accordingly, the output of the OR gate 72 is at a high level. Similarly, when the input signal [3N+2] is at a high level, the output of the AND gate 70 is at a high level when the state of the counter is "3", with the result that the output of the OR gate 72 is also at a high level. When the input signal [3N] is at a high level, the output of the AND gate 71 is at a high level when the state of the counter is "1", with the result that the output of the OR gate 72 is also at a high level. An operation pulse of one word width is applied at all times to the input terminal 62, and the output of the OR gate 72 is shifted by the width of the operation pulse. Therefore, when the number of the input pulses is 3N+1, the output of the register 64 turns to a high level at the time when seven operation pulses are counted. Similarly, when the numbers of the input pulses are 3N+2 and 3N, the output of the register 64 turns to a high level at the time when four and two pulses are counted, respectively. Accordingly, the NOR gate 65 is inhibited by the high level of the output of the register 64, and the output of the NOR gate 65 is held at a low level, and the state of the counter gate 65 is held until a reset signal comes in. The input pulse of the counter serves as additional doubling operation pulses through OR gate 75. The signal [3N] is applied to one input terminal of the OR gate 75, making no additional operation pulse available when the number of pulses is 3N. In other words, seven, four or zero number of additional operation pulses are generated according to the number of data pulses is 3N+1, 3N+2 or 3N. The additional operation pulses are applied to the other input of the OR gate 7 (FIG. 1). A group of gates 73, 74 and 76 generates the exponential compensating pulses, which are used to make equal all exponents of the results of the double operations when the numbers of the input information pulses are 3N+1, 3N+2 and 3N. Therefore, when the numbers of the input pulses are 3N+2, 3N, one and two numbers of the exponential compensating pulses are generated by the group of gates 73, 74 and 76, respectively. Timing waveforms for these operations are shown in FIG. 9.

Figure 10:
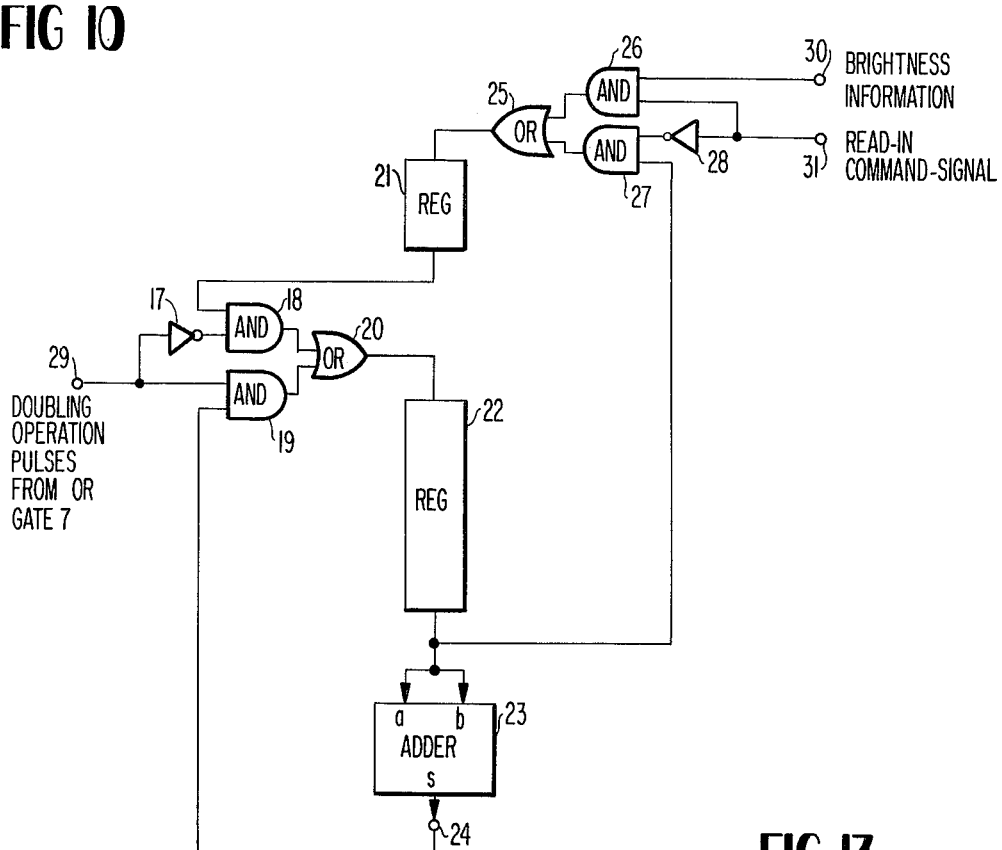
FIG. 10 is a diagram showing an example of a doubling circuit.

Referring to FIG. 10, there is shown an example of a doubling circuit. The doubling-operation pulses are supplied to a terminal 29 through the OR gate 7 (FIG. 1). The terminal 29 serves as one input of a 2-input AND gate 19, and also as one input of a 2-input AND gate 18 through an inverting circuit 17. The outputs of the AND gates 18 and 19 are inputs of a 2-input OR gate 20, and the output of the OR gate 20 is applied to a shift register 22. The output of the shift register 22 is supplied in parallel to input terminals $a$ and $b$ of a full adder 23. The sum output S of the adder 23 is connected to one input of the AND gate 19. The output of the shift register 22 is connected to one input of a 2-input AND gate 27. A read-in control input terminal 31 is connected to the other input of the AND gate 27 through an inverting circuit 28. A brightness information input terminal 30 and the read-in control input terminal 31 are connected to the two inputs of a 2-input AND gate 26. The outputs of the AND gates 26 and 27 are connected to the two inputs of an OR gate 25. The output of the OR gate 25 goes to a shift register 21, and the output of the shift register 21 is connected to the other input of the AND gate 18. The shift register 21 can store one digit consisting of 4 bits. The shift register 22 must be able to store digits necessary for actual operation. Brightness information is supplied in serial digital form from the A/D converter 2 to the input terminal 30. This information is read into the shift registers 21 and 22 when a read-in control pulse comes in the input terminal 31. When a doubling operation pulse is present at the input terminal 29, the output of the full adder circuit 23 is read in the shift register 22 through the gates 19 and 20. When no doubling operation pulse is present at the input terminal 29, the output of the shift register 21 is read in the shift register 22. At this moment, when no signal is present at the read-in control input terminal 31, in the register 22 in stores its own data through the gates 18, 20, the shift register 22 and the gates 27, 25. The information in the shift register 22 is connected concurrently to the two inputs $a$ and $b$ of the full adder 23, and the summed result is returned to the shift register 22 through the gates 19 and 20 whereby the initially stored information is doubled. Thus, by repeating this doubling operation M times, the initial information X stored in the shift register 22 is increased to $2^M \cdot X$ in value. In this manner, the doubling operation is repeated as often as the number of double operation pulses including additional operation pulses which are outputs of the OR gate 75. Thus the doubling operation is repeated as often as N+7, N+4 or N numbers according to the number of the information pulses 3N+1, 3N+2 or 3N respectively.

This doubling operation, or the computing operation of $2^M \cdot X$, is performed by simply circulating the initial information X stored in the register M times through the full adder, with the result that the computation period is a period of M-word times and that only one shift register is necessary for such operation, enabling the circuit construction to be simplified.

Assume that a maximum number of the input pulses is 40. Forty may be broken up as $40 = 3 \times 13 + 1$, where $N = 13$, that is, the additional operation is to be done 7 times, or doubling operations are repeated a total of 20 times. In practice, the doubling operation pulse before the additional operation is generated once for each 3-word time as shown in FIG. 6. Hence, the operation time before the additional operation is given as $13 \times 3 + 1 = 40$ (word-time). In this case, round-up or round-down operations can be performed during an extra 2-word time period. The additional operation pulses are generated at 50% duty cycle whereby round-up or round-down operations are done between the additional pulses. In this case, the additional operation time is $7 \times 2 (= 14)$ word-times. Hence, the time taken for the operation to be completed is $40 + 14 (= 54)$ word-times. Because the error in operations is +1.6% maximum, operation on the information over 4 digits is not practical. According to the invention, therefore, the number of significant digits for the operation is three, or one word-time is of 5-digit times including an idle time. Thus, the operation time required is $54 \times 5 \times 4 = 1080$ bit-times. Accordingly, assuming that a width of one bit pulse is 1/108 ms, or that the bit frequency is 108 KHz, the period of the operations is 10 ms. This frequency is quite practical for circuits using P-channel MOS devices. Instead of P-channel MOS devices, complementary MOS devices may be used whereby an IC digital circuit operable with low power and low voltage can be realized.

Referring to FIG. 11, there is shown an example of an exposure control circuit embodying the invention. Clock pulses having a given reference frequency $f_i$ are supplied to an input terminal 90 of a frequency dividing circuit 91, and its frequency dividing ratio is controlled by the output of an exponential circuit 10. Thus, a clock pulse corresponding to the exponential output is obtained at an input terminal 93 of a down counter 97. The exponential output includes an exponential compensating signal from the corresponding signal generating circuit 9 and also an exponential signal of the brightness information. The clock frequency of the signal at the terminal 93 is determined to be $f_i \cdot 10^{-a}$ for an exponent $a$ of the exponential circuit 10. This is readily realized by selecting the number of cascaded circuits having a frequency dividing ratio 10 according to the exponential signal of the exponential circuit 10. The down-counter 97 is loaded through a latch circuit 96 with significant digits of a result computed by the doubling circuit 3, the computed result being stored in an operation register 95. The synchronizing signal supplied to an input terminal 98 gives the timing necessary for converting serial data in the operation register 95 into parallel data. The conversion is performed by the latch circuit 96. An R-S flip-flop 99 has a set input supplied with an output from the down counter 97 and a reset input supplied with a start signal at terminal 92. An output 100 of the R-S flip-flop 99 is applied to one input of a 2-input NOR gate 101. The other input of the NOR gate 101 is supplied by the start signal at terminal 92. The start signal at terminal 92 is at a high level before the start of exposure. The start signal at terminal 92 resets the frequency dividing circuit 91 and the R-S flip-flop 99. Therefore, the output 100 of the R-S flip-flop is at a low level and the output 102 of the NOR gate is also at a low level.

When the start signal at terminal 92 turns to a low level, the frequency dividing circuit 91 generates clock pulses with a frequency corresponding to an exponential value determined by the exponential circuit 10. At the same time, the output 102 of the NOR gate 101 or the exposure control output turns to a high level. The down-counter 97 starts counting down its content down with each clock pulse. The counter 97, when counting down to zero, generates a borrow output 94, which sets the output of the R-S flip-flop 99 to a high level. At this moment, the output of the gate 101 (i.e., exposure control output), one input of which is supplied with the output of the flip-flop 99, turns to a low level. Operation of this circuit are illustrated by timing waveforms shown in FIG. 12. Thus, an exposure control output is given in terms of a time length for which the output terminal 102 is at a high level. The shutter of the camera is opened during the high level of the exposure control output. Assume, for example, the computed result is AB $\times 10^a$. Then the down-counter 97 is loaded with a value AB (or A $\times$ 10 + B), and the frequency of the exposure clock pulse is $f_i \times 10^{-a}$ corresponding to the exponent value $a$. In other words, the time for the down-counter to count its contents down to zero, i.e., the time for the down-counter to generate a borrow output, is AB $\times$ ($10^a/f_i$), or a signal with a time duration corresponding to the computed result is obtained.

The photometering circuit may be constituted of a suitable photoelectric element such as CdS element. An electrical signal corresponding to the brightness of subject is generated by the photoelectric element and converted into a digital signal by the A/D converter. The A/D converter can be constituted of a circuit similar to the pulse generating circuit shown in FIG. 3.

According to the invention, as has been described, the shutter speed is computed by simply repeating the doubling operations, with the result that only one shift register is needed, the control circuit is simplified and the number of constituent elements of the operational circuits is reduced with the operation speed being increased. The digital circuit of the invention, therefore, will contribute much to realizing efficient IC digital systems at low costs. Furthermore, the operation accuracy is improved due to the fact that errors ascribed to operations are not accumulated with an increase in the number of operations as in the conventional circuits.

The invention has been described in detail in connection with an automatic exposure control system of the aperture preferred type, in which the aperture is preset and then the shutter time is automatically computed. The invention is readily applicable to an automatic exposure control system of shutter preferred type in which the shutter speed is preset and then the aperture is automatically controlled according to a given light level. More specifically, the aperture F is defined by the expression: $(1/F) = K(1/L)(1/ASA)(1/T)$. Generally, dial scales of shutter speeds are set in double sequence, and the selecting of shutter speed is in turn started from a maximum shutter speed T(0). The $n_3$-th shutter speed $T(n_3)$ from the maximum shutter speed T(0) in sequence of the shutter speeds on a shutter dial is represented by the following equation:

$$T(n_3) = T(0) \cdot 2^{-n_3} = T(0) \cdot (2^{1/3})^{-3n_3}.$$

Hence the aperture control information is given as:

$$1/F = K'' \cdot (1/L) \cdot (2^{1/3})^{n_2 + 3n_3}$$

Thus, by generating pulses by three at each step of the shutter setting (where $N_3 = 3n_3$), the aperture control information can be represented as: $1/F = K'' \cdot (1/L) \cdot (2^{1/3})^{n_2 + N_3}$ (6)

Therefore, an aperture control information 1/F can be obtained in the same manner as in the computing operation for the shutter speed. (Note: In the above expression, $K'' = K \cdot T^{-1}(0) \cdot ASA^{-1}(0)$, and $n_3$ is zero or a positive integer.) More especially, the F + ASA preset circuit 4 of FIG. 1 is used as a T + ASA preset circuit. In information pulse generator 5 of FIG. 1, three numbers of information pulses are generated at each step of shutter speed setting. For that purpose, in the circuit of FIG. 3 consisting of the T + ASA preset circuit and the information pulse generator, a value of the variable resistor 46 interlocked with the shutter speed setting dial should be selected suitably. Therefore, assuming $n = n_2 + N_3$ in equation (6), the reciprocal of F is obtained in the same manner as the shutter speed T by utilizing the ternary counter 6, the decision circuit 8, the compensating signal generator 9, the pulse end signal detector 14, the doubling circuit 3, the exponent circuit 10, the photometering circuit 1, and the A/D converter 2 in FIG. 1. In the exposure control circuit in this case, pulses are generated in number according to the resultant value (1/F) comprising an exponent from the exponent circuit 10. The aperture is controlled by a stepping motor driven by these pulses.

Figure 13:
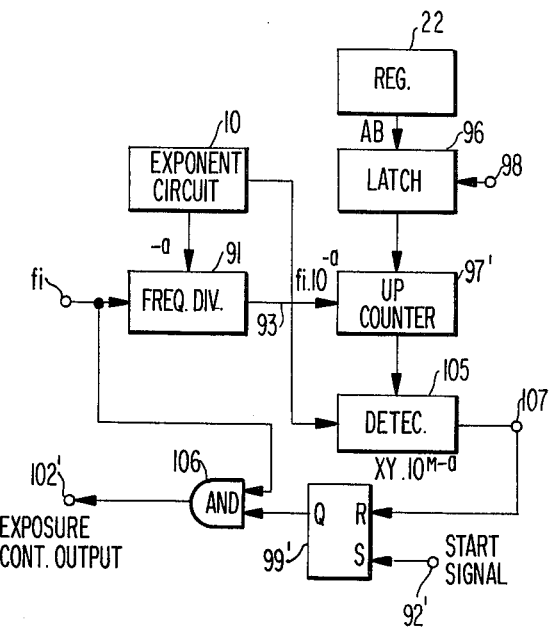
FIG. 13 is a block diagram showing another example of an exposure control circuit.
Figure 14:
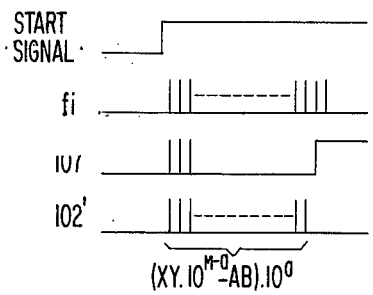
FIG. 14 is a waveform diagram for illustrating the operation of the circuit shown in FIG. 13.

Referring to FIG. 13 showing an example of the aperture control circuit in the shutter-preferred type camera and FIG. 14 showing the waveforms of the circuit of FIG. 13, clock pulses of a given frequency $fi$ are applied to the frequency dividing circuit 91, the dividing ratio of which is controlled by the output of the exponential circuit 10, and also to one input of an AND gate 106. Therefore, the clock pulses of a frequency $fi \cdot 10^{-a}$ are applied to an up-counter 97' initially containing the computed significant number AB. A detecting circuit 105 detects that the contents of the up-counter 97' is $XY \cdot 10^{M-a}$, and generates the high level output 107, where $XY \cdot 10^M$ denotes a maximum value of 1/F. The output of the detecting circuit 105 is connected to a reset terminal of a R-S flip-flop 99'. A set terminal thereof is supplied with the start signal being initially at a low level. An output of the flip-flop 99' is applied to the other input of the AND gate 106. Initially, the start signal is at a low level, and hence the output of the flip-flop 99' is at a low level. Therefore, the output of the AND gate 106 or the exposure control signal is also at a low level.

When the start signal at terminal 92' turns to a high level, the output of the flip-flop 99' turns to a high level and hence the clock pulses (fi) are generated as the exposure control signal. At the same time, the up-counter 97' starts to count up from its contents AB with each clock pulse ($fi \cdot 10^{-a}$). When the count of the counter 97' is $XY \cdot 10^{K-a}$, the detecting circuit 105 generates a high level signal 107 which resets the output of the flip-flop 99' to a low level. Therefore, the AND gate 106 is inhibited, and hence the clock pulses are no longer generated as the exposure control signal. Accordingly, the number of the clock pulses as the aperture control signal is $N_F = (XY \cdot 10^{M-a} \cdot AB) \cdot 10^a$.

The stepping motor which controls an area of the aperture in the camera is driven by the $N_F$ number of the clock pulses according to the computed result of 1/F.

While a preferred embodiment of the invention and a specific modification thereof have been described, it is to be understood that numerous variations may occur to those skilled in the art without departing from the true spirit of the present invention.

What is claimed is:

1. A circuit arrangement for digitally computing an exposure control information comprising:
   means for generating a train of $n$ pulses in number proportional to the quantity of a first information for exposure;
   means for counting the pulses supplied from said pulse generating means;
   means for generating a doubling operation pulse for each count of three pulses;
   decision means for deciding to which of 3N+1, 3N+2 and 3N (where N stands for zero or a positive integer) the number $n$ of said pulses corresponds;
   means responsive to said decision means for generating, at the end of said pulse train, seven or four additional doubling operation pulses when said number of pulses corresponds to 3N+1 or 3N+2, respectively;
   means for generating an exponential compensating signal according to the number of said pulses;
   a register for storing a second information for exposure; and doubling means for repeatedly doubling the information stored in said register as often as the sum of the number of doubling operation pulses generated by said doubling operation pulse generating means and the number of additional doubling operation pulses generated by said additional doubling operation pulse generating means.

2. A circuit arrangement according to claim 1, wherein said first information comprises at least aperture, said second information comprises the reciprocal of the brightness of L of a subject, and the shutter speed is computed by said doubling means by doubling the value 1/L initially stored in said register N+7, N+4 or N times depending on the output of said decision means.

3. A circuit arrangement according to claim 2 further comprising: an exposure control circuit for generating a signal which determines an exposure time according to the computed result from said doubling means and the exponential compensating signal from said compensating signal generating means.

4. A circuit arrangement according to claim 1, wherein said first information comprises at least shutter speed, said second information comprises the reciprocal of the brightness L of a subject, and the reciprocal of the aperture is computed by said doubling means by doubling the value 1/L initially stored in said register N+7, N+4 or N times depending on the output of said decision means.

5. A circuit arrangement according to claim 4 further comprising: an exposure control circuit for generating a signal which determines the aperture value according to the computed result from said doubling means and the exponential compensating signal from said compensating signal generating means.

6. A circuit arrangement according to claim 1, further comprising a photometering means for measuring the brightness L of a subject and storing a digital signal corresponding to the reciprocal value 1/L in said register.

7. A circuit arrangement according to claim 1, wherein said doubling means comprises:
adder means for receiving the value stored in said register and adding that value to itself to obtain a doubled value, and
gating means responsive to said doubling operation pulses for repeatedly supplying the doubled value output to the input of said adder means.

8. A circuit arrangement according to claim 3, wherein said exposure control circuit comprises:
frequency dividing means receiving clock pulses having a frequency $f_i$ and responsive to said exponential compensating signal for generating output clock pulses having a frequency $f_i \cdot 10^{-a}$, where $a$ is the compensating exponent;
a down-counter loaded with the output of said doubling circuit and responsive to said output clock pulses for counting down to zero; and
means responsive to the output of said down-counter for controlling the exposure time.

9. A circuit arrangement according to claim 5, wherein said exposure control comprises:
frequency dividing means receiving clock pulses having a frequency $f_i$ and responsive to said exponential compensating signal for generating output clock pulses having a frequency $f_i \cdot 10^{-a}$, where $a$ is the compensating exponent;
an up-counter loaded with the output of said doubling circuit and responsive to said output clock pulses for counting up;
detecting means connected to the output of said up-counter and responsive to said exponential compensating signal for detecting when the content of said up-counter reaches a predetermined value which is a function of said compensating exponent; and
means responsive to the output of said detecting means for controlling the area of the aperture.

* * * * *

UNITED STATES PATENT AND TRADEMARK OFFICE
CERTIFICATE OF CORRECTION

PATENT NO. : 4,107,704

DATED : August 15, 1978

INVENTOR(S) : Shigehisa IWATA

It is certified that error appears in the above-identified patent and that said Letters Patent are hereby corrected as shown below:

Column 2, line 13 - delete "$T = K' (1/L) (2^{1/3}) (n_1 + n_2 )$"

insert -- $T = K' (1/L) (2^{1/3}) (n_1 + n_2)$     (2) --

Column 3, line 10 - delete "quality" insert -- quantity --

Column 4, line 14 - after "is" delete "gating" insert -- generated -- line 14 - after "pulse" delete "generating" insert -- gating -- line 26 - delete "double-operation" insert

-- doubling operation -- line 31 - before "by" delete "gating" insert -- generated -- line 31 - after "pulse" delete "generating" insert -- gating --

UNITED STATES PATENT AND TRADEMARK OFFICE
CERTIFICATE OF CORRECTION

PATENT NO. : 4,107,704

DATED : August 15, 1978

INVENTOR(S) : Shigehisa IWATA

It is certified that error appears in the above-identified patent and that said Letters Patent are hereby corrected as shown below:

Column 4, line 68 - delete "from" insert -- form --

Column 5, line 1 - after "double" insert -- - -- line 22 - delete "top" insert -- tap --

Column 6, line 44 - after "pulse" insert -- [3N] -- line 44 - after "is" delete "[3N]"

line 45 - after "pulse" delete "[3N+1] and [3N+2]"

line 46 - after "pulses" insert -- [3N+1] and [3N+2] -- line 54 - delete "$I_5$" insert -- $T_5$ --

Column 7, line 6 - after "[3N]" delete "and [3N]"

line 29 - after "circuit" insert -- 9, --

UNITED STATES PATENT AND TRADEMARK OFFICE
CERTIFICATE OF CORRECTION

PATENT NO. : 4,107,704

DATED : August 15, 1978

INVENTOR(S) : Shigehisa IWATA

It is certified that error appears in the above-identified patent and that said Letters Patent are hereby corrected as shown below:

Column 9, line 28 - delete "$2^M.X$" insert -- $2^M \cdot X$ --

Column 10, line 14 - after "from the" delete "corresponding"

insert -- compensating --

Column 12, line 37 - delete "$N_F = (XY \cdot 10^{M-a} \cdot AB) \cdot 10^a.$"

insert -- $N_F = (XY \cdot 10^{M-a} - AB) \cdot 10^a.$ --

Signed and Sealed this

Twenty-fourth Day of April 1979

[SEAL]

Attest:

RUTH C. MASON
*Attesting Officer*

DONALD W. BANNER
*Commissioner of Patents and Trademarks*